Feb. 10, 1953 E. W. DAVIS 2,627,818
RECIPROCATING PUMP WITH OUTLET VALVE HAVING
MATERIAL CUTTING MEANS
Filed March 14, 1946
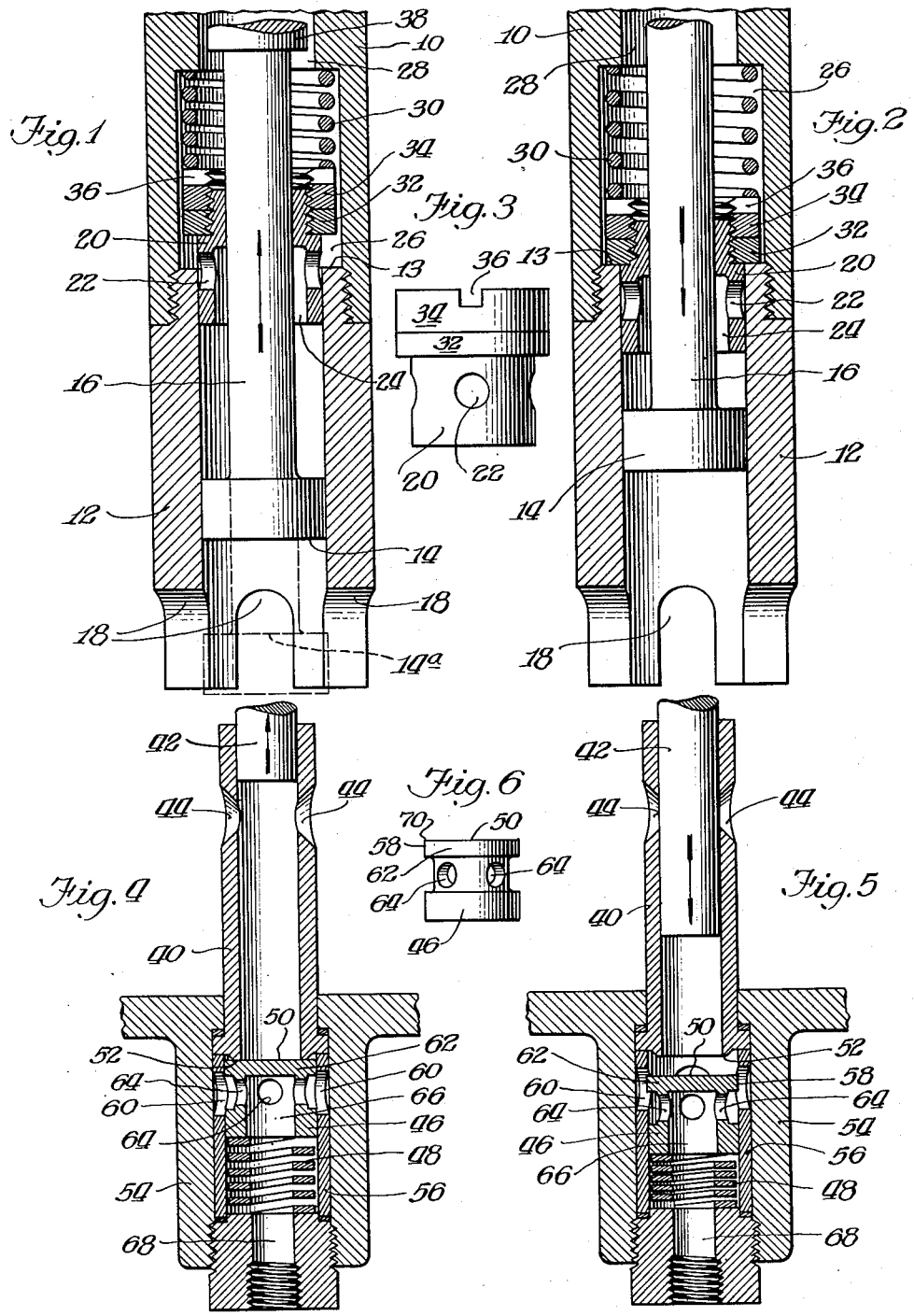
Inventor:
Ernest W. Davis
By Williams, Bradbury & Hinkle
Attorneys.

UNITED STATES PATENT OFFICE 2,627,818

RECIPROCATING PUMP WITH OUTLET VALVE HAVING MATERIAL CUTTING MEANS

Ernest W. Davis, River Forest, Ill.

Application March 14, 1946, Serial No. 654,467

3 Claims. (Cl. 103—166.5)

This invention relates primarily to valve mechanism designed for use in feed devices for lubricant, and particularly for pumps intended for feeding lubricating grease which may contain foreign matter in the nature of paper, cloth, lint or woody material which might interfere with the seating of the valves.

One object of the invention is to provide a valve and cooperating structure by which movement of the valve is adapted to shear off any solid foreign matter which may become lodged across a passage of the valve through which lubricant is to flow.

Another object of the invention is to provide a valve providing for a double seal by virtue of a flat surface adapted to fit over an annular seat and a cylindrical surface seating in a cylindrical valve chamber, the axial movement of the valve serving to uncover a lateral port therein and to withdraw the flat surface of the valve away from the annular seat.

It is also an object of the invention to provide a valve having a lateral port in its cylindrical wall adapted to be closed by the cylindrical surface of a bore in which the valve is movable and which terminates in a transaxial surface providing an annular edge with which the edge of the valve port cooperates in shearing relation as the valve moves toward closed position.

In general the invention provides a cylindrical valve chamber and a cylindrical valve member slidable therein, and so arranged that one of these elements has an opening through which lubricant flows when the valve is opened, and this opening has an edge in the cylindrical wall of the element which cooperates with the edge of a transverse surface on the other element to provide a shearing action for cutting through any foreign substance, such as cloth, wood or paper which may be present in the lubricant, thus permitting the valve member to move to fully closed position and causing the foreign matter to be carried away by the flow of lubricant when the valve is opened.

Other objects and advantages of the invention will appear from the following description, taken in connection with the drawings, in which:

Fig. 1 is a fragmentary axial sectional view of a lubricant pump showing the valve chamber therefor and a valve therein in open position;

Fig. 2 is a similar axial section showing the valve in closed position;

Fig. 3 is a detail elevation of the valve member itself;

Fig. 4 is a partial axial view of a lubricant pump fitted with another form of valve embodying this invention and showing the valve in closed position;

Fig. 5 is a sectional view similar to Fig. 4 but showing the valve in open position;

Fig. 6 is a detail elevation of the valve member shown in Figs. 4 and 5.

The lubricant pump, of which a part is shown in Figs. 1 and 2, may be considered as of the type which is suspended or mounted within a drum or other receptacle containing heavy lubricant and from which the pump feeds the lubricant as it is needed. The main pump cylinder 10 carries an extension 12 at its lower end in which a piston 14 is reciprocable at the end of the piston rod 16. At the lower limit of its stroke the piston 14 descends to the position indicated in broken lines at 14a, and lubricant enters the ports 18 so as to be lifted through the cylinder extension 12 by the piston 14 as it rises. The resulting upward pressure opens the valve member 20 to the position shown in Fig. 1 in which its lateral or radial ports 22, communicating with the downwardly open space 24 inside the valve member, deliver lubricant to the space 26 in the valve chamber which is formed in the lower end of the cylinder 10 between its bore 28 and the upper end of the extension 12. The lubricant thus flows around the valve member 20 and past its spring 30 into the bore 28 of the pump cylinder. The upper portion of the valve member 20 comprises a nut 32 and a lock nut 34 screwed on to the reduced and threaded upper end of the cylindrical valve body, and the upper nut 34 is provided with radial slots 36 through which the lubricant moving upwardly around the nuts 32 and 34 in the valve chamber can pass readily to the central portion thereof, around the piston rod 16, thence to the bore 28 of the pump cylinder.

When the direction of the piston rod 16 is reversed, the plunger portion 38 thereof, which is of larger diameter than the piston rod 16, displaces the lubricant in the lower end of the cylinder bore 28 forcing it upwardly therein for delivery through an outlet port (not shown) at the upper end of the cylinder 10. As soon as the upward movement of the piston rod 16 ceases, the spring 30 forces the valve member 20 downward into the closed position as shown in Fig. 2 in which its lateral or radial ports 22 are closed by the cylindrical wall of the cylinder extension 12, and the abutment shoulder formed by the nut 32 engages the upper end surface 13 of the part 12. If desired, the shoulder provided by the under surface of the nut 32 may be accurately finished and the end surface 13 of the part 12 may be similarly finished to provide a transverse valve seat so that when the surfaces are engaged, as shown in Fig. 2, they will provide a seal supplementing the closure of the ports 22 by the cylindrical wall of the part 12.

In this mechanism, if a fragment of paper, cloth, wood or other foreign substance should become lodged across one of the inlet ports 18, the upward movement of the piston 14 would shear off the material so that a portion of it could be carried along with the lubricant being elevated by the piston 14, and the remaining fragment would be picked up by a subsequent stroke of the piston. If such foreign substance should become lodged across one of the ports 22 of the valve member 20, the downward pressure of the spring 30 might be sufficient to shear the material. If the spring should not accomplish this, then the shearing action would be effected by engagement of the enlarged or plunger portion 38 with the nut 34 in the downward movement of the piston, the stroke of the plunger 38 being sufficient to carry the ports 22 of the valve member below the upwardly facing surface 13 without driving the valve quite to the final limit of its movement at which it is shown in Fig. 2. Thus any foreign particles present in the lubricant will be broken up by the shearing action of the piston 14 or the valve member 20, without interfering with the proper seating of the valve or otherwise impairing the operation of the pump.

Fig. 4, 5 and 6 illustrate a different type of pump in which the lubricant is expelled from the cylinder 40 at the lower end thereof by means of a piston or plunger 42 mounted for reciprocation in the cylinder. The cylinder 40 is usually located within a lubricant reservoir or container (not shown), so that the upward movement of the piston 42 creates a suction or partial vacuum within the cylinder 40, and causes the lubricant to flow into the cylinder through the inlet ports 44 as they are uncovered by the upward movement of the piston 42. During this upward movement, the check valve 46 is held seated against the lower end of the cylinder 40 by means of its spring 48 as shown in Fig. 4. The flat upper surface 50 of the valve member 46 seats against the annular surface 52 at the end of the cylinder 40, and the valve chamber 54 is provided with a cylindrical lining or bushing sleeve 56 in which the cylindrical surface 58 of the upper end portion of the valve member 46 fits snugly when the valve is closed. The valve thus provides a double seal against leakage.

Upon the downward stroke of the piston 42, the lubricant in the cylinder 40 forces the valve 46 to open position as shown in Fig. 5, compressing the spring 48 and moving the flat upper surface 50 of the valve to a position at which the lateral ports 60 in the bushing 56 are uncovered. These ports serve as bypasses through which the lubricant can flow around the upper table or end wall 62 of the valve member 46, and thence through the ports 64 of the valve member itself, and into its central cavity 66 which communicates with the outlet passage 68 through which the lubricant is fed to a point of use.

Preferably the spring 48 is made relatively strong so that when it reacts upwardly to close the valve, it will exert sufficient force to shear off any particle of foreign matter which may have become lodged in the bypass port 60 of the liner sleeve 56. Then upon the down stroke of the piston 42, the foreign material will be flushed through the valve by the outflow of lubricant. The use of a strong spring 48 thus requires a substantial pressure to be built up in the cylinder 40 for opening the valve 46 and insures that the lubricant released by the opening of the valve will flow forcibly through the ports so as to readily carry off any foreign particles which might otherwise become lodged on the seating surfaces. In the present structure the close fit between the cylindrical surface 58 and the upper end portion of the liner sleeve 56 causes the valve 50 to act as a piston for a substantial distance as it is moved downwardly by the pressure of the lubricant and before it passes the bypass ports 60. This insures that there will be a substantial volume of lubricant flowing past the annular valve seat 52 as the lubricant is discharged from the cylinder 40, so that any particles of foreign matter which might otherwise adhere to the seat 52 will be swept away and all seating surfaces of the valve and associated parts will be kept clear by the flow of lubricant discharged from the pump. The close fit between the cylindrical surface 58 of the valve member and the liner sleeve 56 is also relied upon to provide the shearing action between the annular uper edge of the valve at 70 and the edges of the bypass ports 60. In addition, this close fit provides a double sealing effect when the valve is seated with its flat end surface 50 engaging the seat 52 while its cylindrical surface 58 fits snugly in the upper end of the liner sleeve 60.

While there are shown and described herein certain structures embodying the invention and illustrative thereof, it is to be understood that the invention is not limited thereto or thereby but embraces all charges and modifications which come within the scope of the appended claims.

I claim:

1. In a lubricant pump the combination of means forming a pump cylinder extension, a pump piston reciprocable in said cylinder extension, means including a piston rod connected to said piston to reciprocate said piston through a predetermined stroke, means connected to said cylinder extension forming means and forming a valve chamber into which one end of said cylinder extension opens, said valve chamber having a greater cross-sectional area than said cylinder extension, a transverse valve seat formed in said valve chamber at said end of said cylinder extension and which with the wall of said cylinder extension forms a first cutting edge, a valve member encircling said piston rod and slidable thereon, said valve member having a portion of greater cross sectional area than said cylinder extension and adapted to contact said valve seat and having a part slidable in said cylinder extension, said valve portion being reciprocable in said valve chamber and having a cross sectional area smaller than that of said chamber to permit flow of lubricant around said valve portion and through said valve chamber, a lubricant passageway through said valve member part, one end of said passageway being open to said cylinder extension and the other end of said passageway terminating in a radially directed port, said valve member being movable between open position in which said valve portion is lifted from said valve seat and said port is at least partially uncovered by said first cutting edge and closed position in which said port is closed by the wall of said cylinder extension, the edge of said port providing a second cutting edge to cooperate with said first cutting edge to shear off any foreign matter caught therebetween as said valve member moves to closed position, and means on said piston reciprocating means adapted to engage said valve member when the latter is in open position for moving said valve member forcibly to closed position when foreign matter lying across said cutting edges obstructs movement of said valve member to closed position.

2. In a lubricant pump, the combination of means forming a pump cylinder extension, a pump piston reciprocable in said cylinder extension, means including a piston rod connected to said piston to reciprocate said piston through a predetermined stroke, means connected to said cylinder extension forming means and forming a valve chamber into which one end of said cylinder extension opens, said valve chamber having a greater cross sectional area than said cylinder extension, a transverse valve seat formed in said valve chamber at said end of said cylinder extension and which with the wall of said cylinder extension forms a first cutting edge, a valve member encircling said piston rod and slidable thereon, said valve member having a portion of greater cross sectional area than said cylinder extension and adapted to contact said valve seat and having a part slidable in said cylinder extension, said valve portion being reciprocable in said valve chamber and having a cross sectional area smaller than that of said chamber to permit flow of lubricant around said valve portion and through said valve chamber, a lubricant passageway through said valve member part, one end of said passageway being open to said cylinder extension and the other end of said passageway terminating in a radially directed port, said valve member being movable between open position in which said valve portion is lifted from said valve seat and said port is at least partially uncovered by said first cutting edge and closed position in which said port is closed by the wall of said cylinder extension, the edge of said port providing a second cutting edge to cooperate with said first cutting edge to shear off any foreign matter caught therebetween as said valve member moves to closed position, means in said valve chamber and acting on said valve portion to bias said valve member to closed position, and means on said piston reciprocating means adapted to engage said valve member when the latter is in open position for moving said valve member forcibly to closed position should foreign matter lying across said cutting edges prevent movement of said valve member to closed position by said biasing means.

3. In a lubricant pump, the combination of means forming a pump cylinder extension, a pump piston reciprocable in said cylinder extension, means including a piston rod connected to said piston to reciprocate said piston through a predetermined stroke, means connected to said cylinder extension forming means and forming a valve chamber into which one end of said cylinder extension opens, said valve chamber having a greater cross sectional area than said cylinder extension, a transverse valve seat formed in said valve chamber at said end of said cylinder extension and which with the wall of said cylinder extension forms a first cutting edge, a valve member encircling said piston rod and slidable thereon, said valve member having a portion of greater cross sectional area than said cylinder extension and adapted to contact said valve seat and having a cylindrical part slidable in said cylinder extension, said valve member portion being reciprocable in said valve chamber and having a cross sectional area smaller than that of said chamber to permit flow of lubricant around said valve portion and through said valve chamber, a lubricant passageway through said cylindrical part, one end of said passageway being open to said cylinder extension and the other end of said passageway terminating in a radially directed port, said valve member being movable between open position in which said valve portion is lifted from said valve seat and said port is at least partially uncovered by said first cutting edge and closed position in which said port is closed by the wall of said cylinder extension and said valve portion contacts said valve seat, said port and the outer surface of said cylindrical valve part providing a second cutting edge to cooperate with said first cutting edge to shear off any foreign matter caught therebetween as said valve member moves to closed position, a spring in said valve chamber and acting against said valve member to move the latter to closed position, and a shoulder on said piston reciprocating means adapted to engage said valve member when the latter is in open position for moving said valve member forcibly to closed position should foreign matter lying across said cutting edges prevent said spring from moving said valve member to closed position.

ERNEST W. DAVIS.

REFERENCES CITED

The following references are of record in the file of this patent:

UNITED STATES PATENTS

| Number | Name | Date |
|---|---|---|
| 714,096 | Caille | Nov. 18, 1902 |
| 1,202,454 | Clark | Jan. 16, 1917 |
| 1,382,705 | Wood | June 28, 1921 |
| 1,657,658 | Buford | Jan. 31, 1928 |
| 2,222,823 | Parenti | Nov. 26, 1940 |
| 2,280,309 | Graham | Apr. 21, 1942 |

FOREIGN PATENTS

| Number | Country | Date |
|---|---|---|
| 37,339 | Sweden | 1913 |
| 334,410 | Italy | 1936 |
| 468,493 | Germany | 1928 |